United States Patent

Ohkita

[15] 3,681,555

[45] Aug. 1, 1972

[54] PLAY-FREE KNOB FOR PUSH-BUTTON SWITCH

[72] Inventor: Masao Ohkita, Tokyo, Japan

[73] Assignee: Alps Electric Co., Ltd., Tokyo, Japan

[22] Filed: Sept. 30, 1971

[21] Appl. No.: 185,150

[30] Foreign Application Priority Data

Oct. 2, 1970 Japan..........................45/98078

[52] U.S. Cl.....200/172 R, 200/166 PC, 317/101 CC

[51] Int. Cl................................................H01h 3/12

[58] Field of Search..........200/166 CP, 16 D, 172 R; 317/101 CC

[56] References Cited

UNITED STATES PATENTS 3,272,951 9/1966 O'Brien...............200/166 PC X 3,493,706 2/1970 Cherry et al...........200/166 PC

FOREIGN PATENTS OR APPLICATIONS 1,174,316 12/1969 Great Britain..........200/166 PC

*Primary Examiner*—H. O. Jones
*Attorney*—Maxwell James et al.

[57] ABSTRACT

An actuating member for a switch mounted on a circuit board has a projection that moves therewith and which slidably engages the board, so that the knob is reliably guided in a defined path as it actuates the switch. Preferably, the actuating member comprises knob on which the projection is formed, and the board has a slot for receiving the projection.

8 Claims, 3 Drawing Figures

INVENTOR
MASAO OHKITA
BY James Franklin
ATTORNEY

PLAY-FREE KNOB FOR PUSH-BUTTON SWITCH

CROSS REFERENCE

This application is based on Japanese Pat. No. 98,078/70, filed Oct. 2, 1970, the priority of which is hereby claimed.

BACKGROUND OF THE INVENTION

This invention relates to guiding means for the actuating member of a push-button switch that is mounted on a circuit board.

Push-button switches are an important part of modern electronic circuitry. They are used to control many types of circuits such as power, tuning, etc. These circuits nowadays are laid out on circuit boards. The boards are secured to a chassis by means of a frame. In general, the switch comprises a switch circuit block containing movable and stationary contacts connected to said circuit board, an actuating element connected to the movable contacts, and a manually graspable knob connected to the actuating element for moving the latter, and hence the movable contacts so as to switch selected circuits. The switch circuit block is mounted on the circuit board, sometimes by means of the same frame which secures the boards to the chassis. Unfortunately, the frame area that supports the circuit board is small, and the frame supports the switch lever remote from the knob. Thus, when pressure is applied to the knob the switch actuating element tends to bend forward or backward and large bending moments are generated within the circuit board that can loosen the frame with respect to the board, causing malfunction of the switch, and leading to bending of the actuating element and the like.

For reasons of economy the switch circuit block and the actuating element are usually made in a fashion such as to result in relatively large dimensional tolerances. The circuit block is usually molded, and even if great care is taken to produce accurate individual parts, successively produced parts will vary in dimension due to variations in the temperature of the molding machine. The result of all this is that the actuating elements have a high degree of "play" when mounted on the circuit board. Furthermore, it is frequently desirable to have many switch knobs lined up in a row, such as the station selectors on an automobile radio. Then, because of the above described problems, the knobs may well present an uneven, misaligned appearance. By providing additional guiding means for the actuating element, and in particular providing such guiding means on the relatively sturdy circuit board and at a point on the actuating element remote from its point of cantilever mounting at the switch block, all of these disadvantages are avoided.

It is a prime object of the present invention to provide a board-mounted switch in which the projecting actuating element is adequately guided and supported, thereby to produce uniformity of appearance and minimize the possibility of breakage or dislocation of parts.

It is another object of the present invention to provide means for so mounting the guiding element of a board-mounted switch as to reduce the amount of play therein.

It is yet another object of the present invention to provide this improved guidance by means of simple and inexpensive structure and preferably by means of structure which requires no modification in the basic construction of the switches themselves.

The basic construction which presents the problems which this invention solves comprises a relatively rigid circuit board on which the switch block or body is mounted, that switch having an actuating member extending therefrom in cantilever fashion to the end of which a knob or other manually graspable element is secured. In accordance with the present invention the actuating member, at a point remote from the switch block, is provided with a projecting part which moves with that member, which engages the circuit board as it thus moves, and which therefore provides the requisite guide and support for the actuating member of the switch. Preferably that projection is formed as part of the knob, so that the switch structure per se, apart from the knob, can be in conventional and ordinary form.

Preferably, said board is provided with a slot for receiving said part. The part can have a width slightly smaller than the slot width so that lateral movement of the actuating member is prevented. The part can comprise a T-shaped projection of a stem and a crosspiece, said head engaging the upper surface of said board. The part can further comprise a lower head to engage the lower surface of the board. In this way the vertical movement of the actuating member is also prevented.

To the accomplishment of the above, and to such other objects as may hereinafter appear, the present invention relates to the mounting and supporting of switch parts on a circuit board or the like, as defined in the appended claims and as described in this specification taken in conjunction with the accompanying drawings in which:

DESCRIPTION

Figure 1:
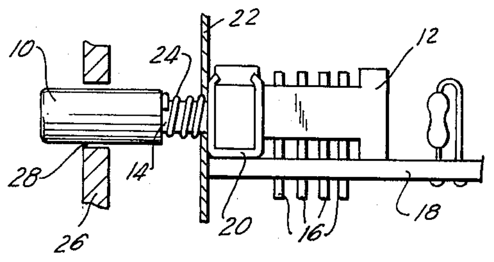
PRIOR ART FIG. 1
FIG. 1 is a cross-sectional view of a switch and knob in accordance with the prior art.

FIG. 1 shows a typical push switch mounted on a circuit board in accordance with the prior art. The switch comprises a switch block 12, an actuating element 14 extending therefrom and longitudinally movable between switch-open and switch-closed positions and a knob 10 mounted on the end of the actuating element 14.

The block 12 has terminals 16 that project therefrom and through a printed circuit board 18 for connection to the circuit to be controlled. A frame 20 receives the lever 14 and is typically secured to the board 18 by rivets and to a chassis 22 by screws. A coil spring 24 is received about the lever 14 so that it can return the knob 10 to its initial position. A panel 26 has a hole 28 for receiving the knob 10.

It will be noted that the knob 10 is relatively remote from the frame 20. Hence when the knob 10 is pushed a large bending moment is applied to the relatively small area of frame 20 and to the rivets securing the frame 20 to the board 18, thereby causing the rivets to become loose. This means that actuating element 14 will no longer be in the normal direction with respect to panel 26 and knob 10 will present an uneven appearance. This is especially annoying if several knobs are to be juxtaposed, as with station selector knobs on an automobile radio. Also, said bending moment can bend the actuating element 14, which also causes an uneven appearance of the knob 10. More importantly, the knob 10 can work loose if the element 14 is bent, because the knob will no longer securely grip the lever.

Figure 2:
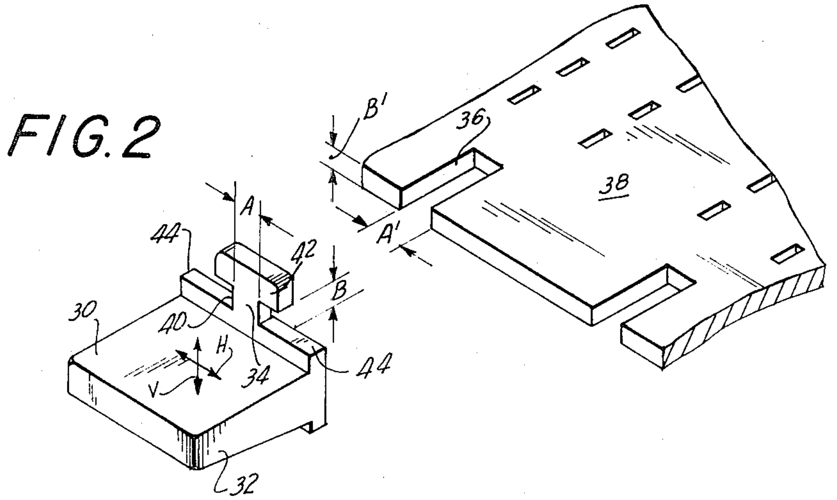
FIG. 2 is a perspective view of a knob and circuit board in accordance with the present invention.
Figure 3:
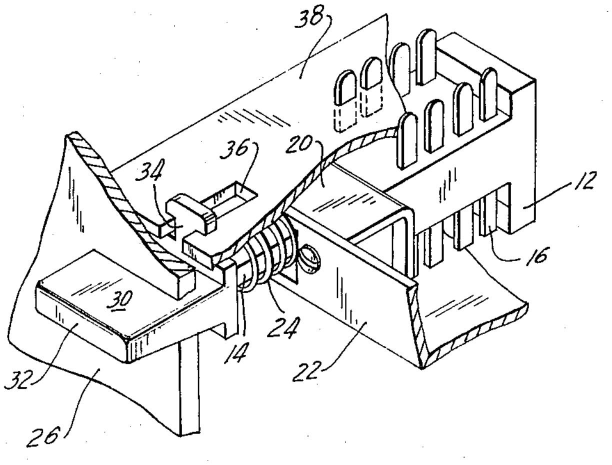
FIG. 3 is a perspective view of a completely assembled knob, switch, and circuit board in accordance with the present invention.

FIGS. 2 and 3 illustrate the construction of the present invention. The circuit board 38 has the switch box 12 mounted thereon by means of frame 20, and actuating element 14 extends out from the switch block 12 in cantilever fashion, extending through chassis 22 and panel 26, all as in FIG. 1. The knob 30 secured to the extending end of the actuating element 14 in the embodiment of FIGS. 2 and 3 corresponds to the knob 10 in the prior art embodiment of FIG. 1. It differs from the FIG. 1 embodiment, however, in comprising not only a main section 32 (the counterpart to all of the knob 10 of the FIG. 1 embodiment) but also a guiding means 34 which extends laterally from the main section 32 (in a direction substantially at right angles to the direction of operative movement of the knob 30), and which is designed to guidingly co-act with the circuit board 38 as the knob 30 and the actuating member 14 move between operative positions. (The knob 30 in effect comprises a part of the guiding member 14.) The circuit board 38 is appropriately configured to produce the desired guiding co-action.

More specifically, the guiding means 34 comprises a substantially T-shaped part extending from the knob 30 and comprising a stem 40 and an upper head 42. The circuit board 38 is provided with an open-ended slot 36 in which the stem 40 is slidably received, the head 42 sliding over the upper surface of the board 38 on both sides of the slot 36. The width A of stem 42 is only slightly smaller than the width A′ of slot 36, thereby to inhibit lateral movement of the knob 30 and hence of the projecting end of the switch actuating element 14. The engagement between the head 42 and the upper surface of the circuit board 38 inhibits any downward bending of the actuating element 14. The guiding means 34 may further comprise a lower head 44 extending to both sides of the stem 40 at the lower end thereof and adapted to engage the lower surface of the circuit board 38, thereby to inhibit upward bending of the actuating element 14. The distance B between the lower surface of upper head 42 and the upper surface of lower head 44 is preferably only slightly greater than the thickness B′ of the board 38, so that vertical movement of the knob 30 (movement in the direction of the thickness of the circuit board 38) is substantially prevented.

As a result of this arrangement, and as can clearly be seen from FIG. 3, the outwardly extending end of the actuating element 14, normally remote from the switch block 12, is now reliably supported and guided in its movement. That support and guidance is derived from the very circuit board 38 on which the switch block 12 is mounted, thus minimizing any possibility of distortion or breakage of parts and ensuring that the knobs 30 of the various switches involved will be uniformly positioned and will retain that uniform positioning over a long period of strenuous use. Since the guidance is provided by means of a part formed integrally with the knob 30, an element which can readily and inexpensively be formed by a molding procedure, the cost of incorporating this additional support and guidance feature into a circuit board-switch assembly is greatly minimized, and the switches proper (the switch block 12, the actuating element 14, and all of the other switch parts exclusive of the knob) require no modification whatsoever so that standard inexpensive parts may be used.

While but a single embodiment of the present invention has been here specifically disclosed, it will be apparent that many variations may be made therein, all without departing from the spirit of the invention as defined in the following claims.

I claim:

1. In combination with a switch mounted on a board, said switch having a slidable actuating member spaced from said board and movable in a given direction between operative positions; guiding means for said actuating member comprising a part extending from said actuating member toward said board and movable with said actuating member in slidable engagement with said board as said actuating member moves in said given direction.

2. The combination of claim 1, in which said board is provided with a slot extending in said given direction and said part is at least partially received in and slidable along said slot as said actuating member moves in said given direction.

3. The combination of claim 2, in which said part is substantially T-shaped, comprising a stem and an upper head, said stem being slidably received in said slot and said head engaging and sliding over the upper surface of said board.

4. The combination of claim 3, in which said part further comprises a lower head spaced from said upper head by a distance substantially the same as the thickness of the slotted portion of said board, thereby to engage and slide over the lower surface of said board as said upper head engages and slides over the upper surface of said board, thereby to restrain movements of said actuating means in a direction perpendicular to said board.

5. The combination of claim 3, in which the width of said slot is slightly greater than the width of said stem, whereby movement of said actuating means is restrained in a direction lateral of said given direction.

6. The combination of claim 2, in which said slot permits only translation motions of said actuating member in said given direction.

7. The combination of claim 6, in which said translational motion is a linear motion.

8. The combination of claim 1, wherein said actuating member comprises a knob and said part is integrally formed with said knob.

* * * * *